US012579033B2

(12) United States Patent
Wu et al.

(10) Patent No.: US 12,579,033 B2
(45) Date of Patent: Mar. 17, 2026

(54) DATA STORAGE METHOD AND APPARATUS BASED ON ADDITIONAL CHECK CODES AND CHECK CODES CORRESPONDING TO ORIGINAL ENCODING METHOD, DEVICE, AND NON-TRANSITORY READABLE STORAGE MEDIUM

(71) Applicant: SUZHOU METABRAIN INTELLIGENT TECHNOLOGY CO., LTD., Jiangsu (CN)

(72) Inventors: Ruizhen Wu, Jiangsu (CN); Yongxing Zhang, Jiangsu (CN); Jingjing Chen, Jiangsu (CN); Xu Zhang, Jiangsu (CN); Lin Wang, Jiangsu (CN); Tong Liu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/706,136

(22) PCT Filed: Sep. 29, 2022

(86) PCT No.: PCT/CN2022/122736
§ 371 (c)(1),
(2) Date: Apr. 30, 2024

(87) PCT Pub. No.: WO2023/184911
PCT Pub. Date: Oct. 5, 2023

(65) Prior Publication Data
US 2025/0117292 A1  Apr. 10, 2025

(30) Foreign Application Priority Data

Mar. 30, 2022  (CN) ......................... 202210321277.9

(51) Int. Cl.
*G06F 11/10* (2006.01)

(52) U.S. Cl.
CPC ...... *G06F 11/1076* (2013.01); *G06F 11/1004* (2013.01); *G06F 11/1048* (2013.01)

(58) Field of Classification Search
CPC ............. G06F 11/1004; G06F 11/1048; G06F 11/1076; G06F 3/0619; G06F 3/0638; G06F 3/0689
See application file for complete search history.

(56) References Cited

U.S. PATENT DOCUMENTS

| | | | | |
|---|---|---|---|---|
| 10,782,894 B1 * | 9/2020 | Han | ...................... | G06F 3/0689 |
| 2004/0078642 A1 * | 4/2004 | Nanda | ................. | G06F 11/1076 |
| | | | | 714/E11.034 |

(Continued)

FOREIGN PATENT DOCUMENTS

| | | |
|---|---|---|
| CN | 104160452 A | 11/2014 |
| CN | 104267913 A | 1/2015 |

(Continued)

OTHER PUBLICATIONS

A Randomly Expandable Method for Data Layout of RAID Storage Systems De-zhai Yuan Sep. 14, 2017 https://arxiv.org/pdf/1709.04708 (Year: 2017).*

(Continued)

*Primary Examiner* — Joseph O Schell
(74) *Attorney, Agent, or Firm* — Dennemeyer & Associates LLC

(57) ABSTRACT

Disclosed in the embodiments of the present application are a data storage method and apparatus, a device, and a non-transitory readable storage medium. According to the embodiments of the present application, F parity blocks occupying blank storage areas are added to a RAID system, which not only increases error tolerance but also eliminates (Continued)

If at least one parity block is located in any stripe for data to be stored in a RAID system, a global position array for representing the position of each block in the RAID system is acquired — S101

According to the global position array, a data group is formed by using user data to be stored in the stripe, empty block data, and unknown additional check codes located in the at least one parity block — S102

Based on the global position array, the data group and the original encoding method corresponding to the stripe, the additional check codes and the check codes corresponding to the original encoding method are generated in a Galois field — S103

According to the global position array, the user data, the empty block data, the additional check codes and the check codes corresponding to the original encoding method are stored into corresponding blocks in the stripe — S104 the need for additional parity disks. During data storage, corresponding original check codes are solved according to an original encoding method, and additional check codes located on the parity blocks are solved simultaneously. Thus, it is possible to recover more erroneous data based on the original check codes and the additional check codes. When an error occurs in a disk in which any block in a stripe is located and data loss occurs in other blocks of the same stripe, the corresponding data can still be recovered.

19 Claims, 3 Drawing Sheets

(56)                    References Cited

U.S. PATENT DOCUMENTS

| | | | | |
|---|---|---|---|---|
| 2004/0078643 A1* | 4/2004 | Ghosh | ................. | G06F 11/1076 714/E11.034 |
| 2009/0204846 A1* | 8/2009 | Baloun | ............... | G06F 11/1076 714/E11.034 |
| 2013/0055012 A1* | 2/2013 | Roh | ...................... | G06F 11/108 714/6.22 |
| 2013/0124776 A1 | 5/2013 | Hallak et al. | | |
| 2013/0139023 A1* | 5/2013 | Han | ................... | G11B 20/1866 714/752 |
| 2015/0089282 A1* | 3/2015 | Taranta, II | .......... | G06F 11/1076 714/6.24 |
| 2017/0168897 A1 | 6/2017 | Blaum et al. | | |
| 2017/0255519 A1* | 9/2017 | Zhang | ................. | H03M 13/356 |
| 2018/0004443 A1* | 1/2018 | Carter | ................... | G06F 3/0619 |
| 2018/0032395 A1* | 2/2018 | Yang | ................... | H03M 13/154 |
| 2019/0347162 A1* | 11/2019 | Moussa | ................. | G06F 3/0659 |
| 2024/0264906 A1* | 8/2024 | Wu | ...................... | G06F 11/1004 |

FOREIGN PATENT DOCUMENTS

| | | |
|---|---|---|
| CN | 107562377 A | 1/2018 |
| CN | 110149260 A | 8/2019 |
| CN | 111078124 A | 4/2020 |
| CN | 111095217 A | 5/2020 |
| CN | 112799604 A | 5/2021 |
| CN | 113297000 A | 8/2021 |
| CN | 113297001 A | 8/2021 |
| CN | 114253478 A | 3/2022 |
| CN | 114415982 A | 4/2022 |
| CN | 114442950 A | 5/2022 |

OTHER PUBLICATIONS

A Low Complexity Design of Reed Solomon Code Algorithm for Advanced RAID System by Min-An Song Published by IEEE Transactions on Consumer Electronics, May 2007 https://ieeexplore. ieee.org/stamp/stamp.jsp?tp=&arnumber=4266897 (Year: 2007).*
International Search report for PCT/CN2022/122736 mailed on Dec. 28, 2022.

* cited by examiner

Fig. 1

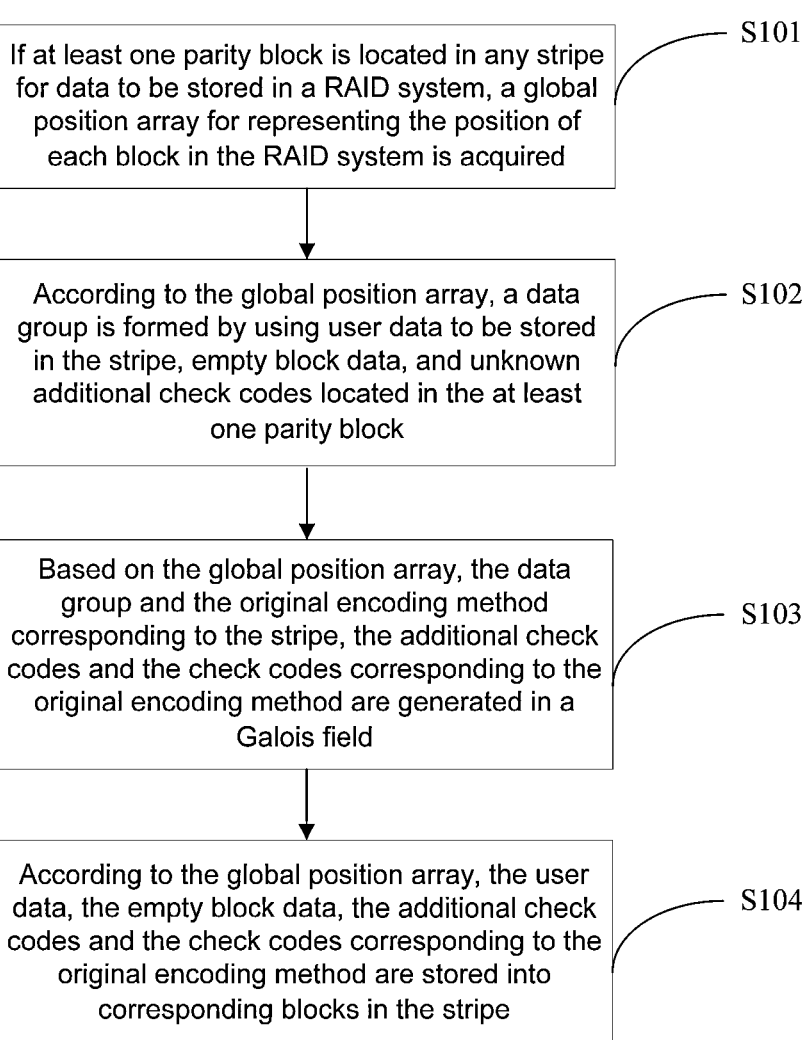

S101

If at least one parity block is located in any stripe for data to be stored in a RAID system, a global position array for representing the position of each block in the RAID system is acquired

S102

According to the global position array, a data group is formed by using user data to be stored in the stripe, empty block data, and unknown additional check codes located in the at least one parity block

S103

Based on the global position array, the data group and the original encoding method corresponding to the stripe, the additional check codes and the check codes corresponding to the original encoding method are generated in a Galois field

S104

According to the global position array, the user data, the empty block data, the additional check codes and the check codes corresponding to the original encoding method are stored into corresponding blocks in the stripe

| | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |

Fig. 4
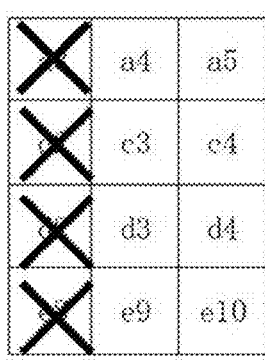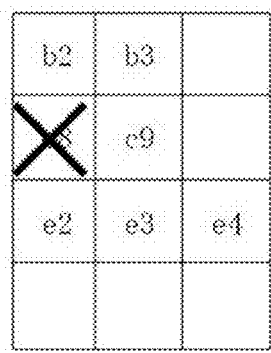
Fig. 5
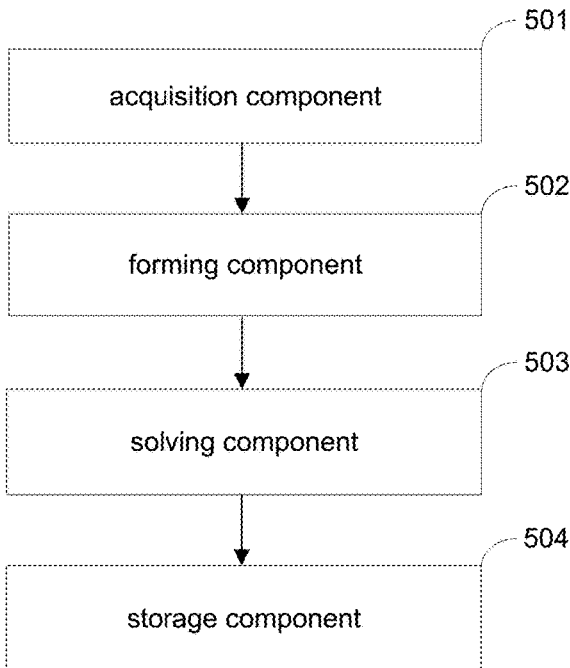
Fig. 6
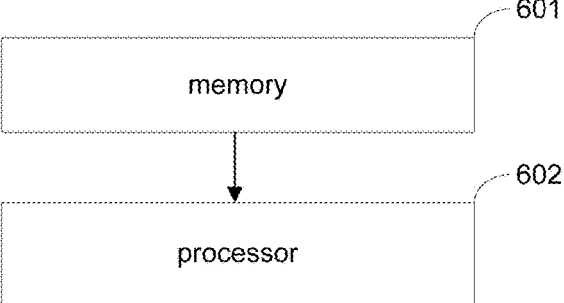

DATA STORAGE METHOD AND APPARATUS BASED ON ADDITIONAL CHECK CODES AND CHECK CODES CORRESPONDING TO ORIGINAL ENCODING METHOD, DEVICE, AND NON-TRANSITORY READABLE STORAGE MEDIUM

CROSS-REFERENCE TO RELATED APPLICATIONS

This is a 35 U.S.C. 371 National Stage Patent Application of International Application No. PCT/CN2022/122736, filed Sep. 29, 2022, which claims priority to Chinese application 202210321277.9, filed Mar. 30, 2022, each of which is hereby incorporated by reference in its entirety.

TECHNICAL FIELD

The present application relates to the field of computer technologies, and in particular, to a data storage method and apparatus, a device, and a non-transitory readable storage medium.

BACKGROUND

Currently, multiple disks can be combined to form a large-capacity disk array, which is referred to as a disk array RAID (redundant arrays of independent disks). Accordingly, technologies such as RAID 0, RAID 1, RAID 5, RAID 6, etc., have been derived. Currently, RAID 5 and RAID 6 are commonly used.

RAID 5 may allow for a maximum of 1 data error per stripe, while RAID 6 may allow for a maximum of 2 data errors per stripe. Hence, the existing RAID 5 and RAID 6 cannot perform recovery for cases where there are three or more data errors in a stripe. If it is desired to perform recovery for cases where there are three or more data errors in a stripe, it is necessary to add one or more additional parity disks to a disk array, thereby improving the error tolerance. However, this method not only reduces the proportion of valid data in the entire storage system, but also cannot solve the problem that an error occurs in a disk wherein any block in a stripe is located and data loss occurs in other blocks of the same stripe. Therefore, the method of directly adding parity disks to a disk array incurs high costs, low efficiency, and increased complexity, which does not achieve efficient storage.

Therefore, how to improve error tolerance and storage efficiency is a problem that a person skilled in the art needs to solve.

SUMMARY

According to a first aspect, an embodiment of the present application provides a data storage method, which is applied to a RAID system, the RAID system including F parity blocks occupying blank storage areas, and the method includes:

if at least one parity block is located in any stripe for data to be stored in the RAID system, a global position array for representing the position of each block in the RAID system is acquired;

according to the global position array, a data group is formed by using user data to be stored in the stripe, empty block data, and unknown additional check codes located in the at least one parity block;

based on the global position array, the data group and the original encoding method corresponding to the stripe, the additional check codes and the check codes corresponding to the original encoding method are generated in a Galois field; and according to the global position array, the user data, the empty block data, the additional check codes and the check codes corresponding to the original encoding method are stored into corresponding blocks in the stripe.

In some embodiments, the generation process of the global position array includes:

m mutually-unequal numerical values are generated based on the total number, m, of blocks in the RAID system;

F mutually-unequal preset values are determined;

the global position array is constructed based on the m mutually-unequal numerical values and the F mutually-unequal preset values.

In some embodiments, the global position array is:

$$v = \begin{bmatrix} \dfrac{1}{a_1 + b_1} & \dfrac{1}{a_1 + b_2} & \cdots & \dfrac{1}{a_1 + b_m} \\ \dfrac{1}{a_2 + b_1} & \dfrac{1}{a_2 + b_2} & \cdots & \dfrac{1}{a_2 + b_m} \\ \cdots & \cdots & \cdots & \cdots \\ \dfrac{1}{a_F + b_1} & \dfrac{1}{a_F + b_2} & \cdots & \dfrac{1}{a_F + b_m} \end{bmatrix}$$

wherein, $v$ represents the global position array, $a_1$, $a_2, \ldots, a_F$ represent F mutually-unequal preset values, and $b_1$, $b_2$, $\ldots$, $b_m$ represent m mutually-unequal numerical values.

In some embodiments, based on the global position array, the data group and the original encoding method corresponding to the stripe, generating the additional check codes and the check codes corresponding to the original encoding method in a Galois field includes:

based on the global position array and the data group, an equation with the additional check codes as an unknown variable is constructed;

based on the original encoding method, an equation with the additional check codes and the check codes corresponding to the original encoding method as unknown variables is constructed; and the constructed equations are solved jointly to obtain the additional check codes and the check codes corresponding to the original encoding method.

In some embodiments, the value of F is determined based on the block error probability in the RAID system in a preset time period.

In some embodiments, the F parity blocks are distributed in any stripe in the RAID system, and/or distributed in a RAID 5 stripe in the RAID system, and/or distributed in a stripe in the RAID system in which the number of blank blocks is greater than a preset threshold.

In some embodiments, the method further includes:

if an error occurs in any block in the RAID system, data recovery is performed based on the additional check codes and/or a decoding method corresponding to the original encoding method.

According to a second aspect, an embodiment of the present application provides a data storage apparatus, which is applied to a RAID system, the RAID system including F parity blocks occupying blank storage areas, and includes:

an acquisition component, configured to, if at least one parity block is located in any stripe for data to be stored in the RAID system, acquire a global position array that is configured to represent the position of each block in the RAID system;

a forming component, configured to, according to the global position array, form a data group by using user data to be stored in the stripe, empty block data, and unknown additional check codes located in the at least one parity block;

a solving component, configured to, based on the global position array, the data group and the original encoding method corresponding to the stripe, generate the additional check codes and the check codes corresponding to the original encoding method in a Galois field; and a storage component, configured to, according to the global position array, store the user data, the empty block data, the additional check codes and the check codes corresponding to the original encoding method into corresponding blocks in the stripe.

In a third aspect, an embodiment of the present application provides an electronic device, including:

a memory, configured to store a computer program; and a processor, configured to execute the computer program, so as to implement the data storage method disclosed in the foregoing.

In a fourth aspect, an embodiment of the present application provides a non-transitory readable storage medium configured to store a computer program, wherein the computer program, when executed by a processor, implements the data storage method disclosed in the foregoing.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description show merely embodiments of the present application, and a person skilled in the art may still derive other drawings from the accompanying drawings without inventive efforts.

FIG. 1 is a flowchart of a data storage method according to an embodiment of the present application;

FIG. 4 is a schematic diagram of erroneous data according to an embodiment of the present application;

FIG. 5 is a schematic diagram of a data storage apparatus according to an embodiment of the present application; and FIG. 6 is a schematic diagram of an electronic device according to an embodiment of the present application.

DETAILED DESCRIPTION OF THE EMBODIMENTS

Figures 2, 3:
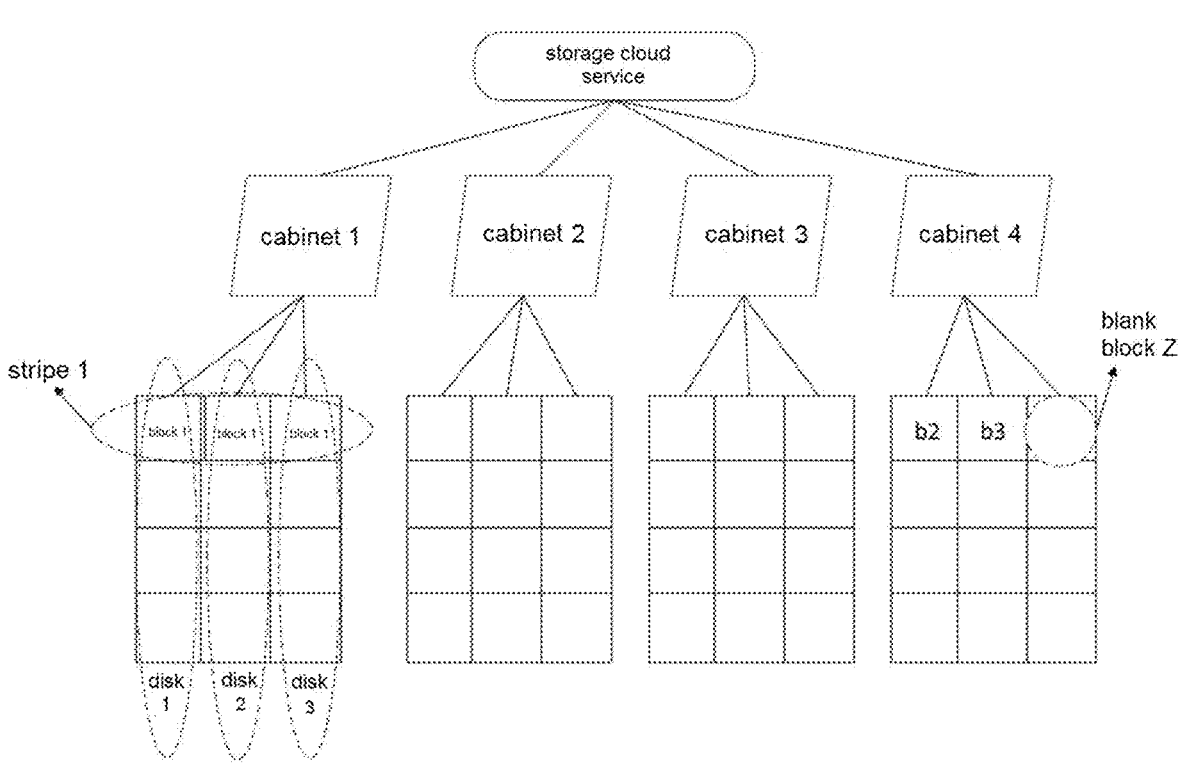
FIG. 2 is a schematic diagram of a RAID system according to an embodiment of the present application.
FIG. 3 is a schematic diagram of a global position array according to an embodiment of the present disclosure.

The following clearly and completely describes the technical solution in the embodiments of the present application with reference to the accompanying drawings in the embodiments of the present application. Apparently, the described embodiments are merely a part rather than all of the embodiments of the present application. All other embodiments obtained by a person skilled in the art based on the embodiments of the present application without inventive efforts shall belong to the scope of protection of the embodiments of the present application.

Currently, the existing RAID 5 and RAID 6 cannot perform recovery for cases where there are three or more data errors in a stripe. If it is desired to perform recovery for cases where there are three or more data errors in a stripe, it is necessary to add one or more additional parity disks to a disk array, thereby improving the error tolerance. However, this method not only reduces the proportion of valid data in the entire storage system, but also cannot solve the problem that an error occurs in a disk wherein any block in a stripe is located and data loss occurs in other blocks of the same stripe. Therefore, the method of directly adding parity disks to the disk array incurs high costs, low efficiency, and increased complexity, which does not achieve efficient storage. To this end, the embodiments of the present application provide a data storage solution, which can improve error tolerance and storage efficiency.

Referring to FIG. 1, an embodiment of the present application discloses a data storage method, which is applied to a RAID system, the RAID system including F parity blocks occupying blank storage areas, and includes:

S101: if at least one parity block is located in any stripe for data to be stored in a RAID system, a global position array for representing the position of each block in the RAID system is acquired.

A RAID system may be composed of several disks of the same type or different types, and different disks may be located in the same cabinet or different cabinets. Each cabinet corresponds to a controller, which is used for controlling the data writing process to the local cabinet, and storage spaces on different cabinets are integrated by means of a cloud service. User data is respectively distributed and stored in different disks based on a distribution policy and a control method corresponding to the RAID. In this case, for a disk array, each unit providing parity services horizontally is referred to as a stripe, and data storage units included in each stripe on a disk are referred to as blocks. As shown in FIG. 2, a RAID system includes 4 cabinets, and each cabinet includes 3 disks. Blocks 1 respectively corresponding to a disk 1, a disk 2 and a disk 3 in the cabinet 1 form a strip 1.

Generally, not all blocks in a stripe necessarily contain data, and there may also be blank blocks in a stripe in which no data is stored, such as a stripe X in FIG. 2, including: data b2, data b3 and a blank block Z. In this case, the blank block Z can be designated as a parity block in this embodiment, thereby utilizing the blank storage area while also adding parity data.

S102: according to the global position array, a data group is formed by using user data to be stored in the stripe, empty block data, and unknown additional check codes located in the at least one parity block.

In this embodiment, the global position array is used to represent the position of each block in the RAID system. Taking FIG. 2 as an example, it is assumed that the RAID system shown in FIG. 2 has 48 blocks in total, 48 label values are used to represent each block individually, and the 48 label values constitute a global position array. If the 48 label values are taken from the natural numbers 1, 2, . . . , 48, the elements and positions in the global position array are as shown in FIG. 3.

In FIG. 3, the gray blocks are used to store the original check codes corresponding to the original encoding method (e.g., RAID 5 or RAID 6), the white blocks are used to store user data, and the diamond-shaped blocks are used to store the additional check codes. The block positions of the user data and the original check codes depend on a load balance policy used by the original encoding method, and the block positions corresponding to the additional check codes are preset. In an optional embodiment, the F parity blocks are distributed in any stripe in the RAID system, and/or distributed in a RAID 5 stripe in the RAID system, and/or distributed in a stripe in the RAID system in which the number of blank blocks is greater than a preset threshold. Hence, the block positions corresponding to the additional check codes may be randomly distributed in the RAID system, may also be distributed in a RAID 5 stripe in the RAID system, and may also be distributed in a stripe in the RAID system in which there are a larger number of blank blocks.

Certainly, the global position array may also be configured according to a predetermined rule. For example, the global position array may be configured by using m mutually-unequal numerical values and F mutually-unequal preset values as follows. In an optional embodiment, a generation process of the global position array includes: generating m mutually-unequal numerical values based on the total number, m, of blocks in the RAID system; determining F mutually-unequal preset values; and constructing the global position array based on the m mutually-unequal numerical values and the F mutually-unequal preset values.

In an optional embodiment, the global position array is:

$$v = \begin{bmatrix} \dfrac{1}{a_1 + b_1} & \dfrac{1}{a_1 + b_2} & \cdots & \dfrac{1}{a_1 + b_m} \\ \dfrac{1}{a_2 + b_1} & \dfrac{1}{a_2 + b_2} & \cdots & \dfrac{1}{a_2 + b_m} \\ \cdots & \cdots & \cdots & \cdots \\ \dfrac{1}{a_F + b_1} & \dfrac{1}{a_F + b_2} & \cdots & \dfrac{1}{a_F + b_m} \end{bmatrix}$$

wherein, v represents the global position array, $a_1$, $a_2$, ..., $a_F$ represent F mutually-unequal preset values, and $b_1$, $b_2$, ..., $b_m$ represent m mutually-unequal numerical values.

S103, based on the global position array, the data group and the original encoding method corresponding to the stripe, the additional check codes and the check codes corresponding to the original encoding method are generated in a Galois field.

In an optional embodiment, based on the global position array, the data group and the original encoding method corresponding to the stripe, generating the additional check codes and the check codes corresponding to the original encoding method in a Galois field includes: based on the global position array and the data group, constructing an equation with the additional check codes and the check codes corresponding to the original encoding method as unknown variables; based on the original encoding method, constructing an equation with the additional check codes and the check codes corresponding to the original encoding method as unknown variables; and solving the constructed equations jointly to obtain the additional check codes and the check codes corresponding to the original encoding method.

Assuming that m=48, F=2, and setting that a1=1, a2=2; b1=1, b2=2, ..., b48=48, v obtained in the Galois field is:

$$v = \begin{bmatrix} 142 & 244 & \cdots & 110 & 72 \\ 244 & 71 & \cdots & 72 & 137 \end{bmatrix}$$

Assuming that data required to be stored for a stripe for data to be stored includes: 0 (empty block data, i.e. no data), R (additional check code), and A (user data), a data group [0, R, A] is formed according to the arrangement positions of data 0, R, and A in the stripe. The arrangement positions of data 0, R, A in the stripe may be determined based on the corresponding elements in the global position array.

In some embodiments, a system of linear equations is constructed by taking the additional check codes and the check codes corresponding to the original encoding method as unknown variables, and the additional check codes and the check codes corresponding to the original encoding method can be obtained by solving the system of equations.

S104: according to the global position array, the user data, the empty block data, the additional check codes and the check codes corresponding to the original encoding method are stored into corresponding blocks in the stripe.

The storage positions of the user data, the empty block data, the additional check codes and the check codes corresponding to the original encoding method in the stripe depend on a load balance policy used by the original encoding method and preset block positions corresponding to the additional check codes.

In an optional embodiment, if an error occurs in any block in the RAID system, data recovery is performed based on additional check codes and/or a decoding method corresponding to an original encoding method; and if an error occurs in a disk where any block in a stripe is located and data loss occurs in other blocks of the same stripe, data recovery is performed based on additional check codes and a decoding method corresponding to an original encoding method. Taking the RAID system shown in FIG. 2 as an example, as shown in FIG. 4, the blocks marked with "x" indicate data errors, and the user data c7 and c8 are lost, and therefore, data recovery cannot be achieved by using only RAID 6 or RAID 5. However, according to the encoding in this embodiment, a3, e8, and e11 may be recovered first, and then other data is recovered.

Hence, in this embodiment, F parity blocks occupying blank storage areas are added to the RAID system, which not only increases error tolerance but also eliminates the need for additional parity disks. During data storage, corresponding original check codes are solved according to an original encoding method, and additional check codes located on the parity blocks are solved simultaneously. Thus, it is possible to recover more erroneous data based on the original check codes and the additional check codes. When an error occurs in a disk in which any block in a stripe is located and data loss occurs in other blocks of the same stripe, the corresponding data can still be recovered. Therefore, this solution offers lower costs and complexity, and higher storage efficiency, so that efficient storage can be achieved, and error tolerance and storage efficiency can be improved.

It should be noted that, a larger F may affect the effective storage space and the IOPS (Input/Output Operations Per Second, the number of reading/writing operations per second), while also adding complexity; and a smaller F may reduce error tolerance. Therefore, an appropriate F needs to be selected to balance between the IOPS and the error tolerance. In an optional embodiment, the value of F is determined based on the block error probability in the RAID system in a preset time period.

In some embodiments, assuming that the parameter N is the total number of disks; R is the average number of parity blocks used in the RAID, with 1 for RAID 5 and 2 for RAID 6, taking their average value under the storage system; s is the number of simultaneous erroneous blocks that need to be ensured, with s=1+F or s=2+F; delta is the probability of unknown errors occurring in a block during disk operation;

E is the total number of disks in the parity group; lambda is the annual failure probability of the disk; P is the block error probability; and t is the required duration for ensuring secure operation, the formula for calculating the block error probability P is as follows:

$$
\begin{cases}
\text{lamda}' = N * \text{lamda}/365/24 \\
\text{delta}' = N * \text{delta}/365/24 \\
Pe = \sum_{i=R}^{N} \dfrac{(\text{lamda}'^{*}i)^{i} e^{(-\text{lamda}'^{*}i)}}{i!} * \sum_{j=i}^{N} \dfrac{(\text{delta}'^{*}t)^{j} e^{(-\text{delta}'^{*}i)}}{j!} \\
P = \left(1 - (1 - Pe)^{(365*24/t)} * \dfrac{E!R!(N-R)!}{R!N!(E-R)!}\right)
\end{cases}
$$

After that, the value of s in the formula can be adjusted to obtain the desired block error probability. Based on the set s, encoding can be performed according to the embodiments of the present application, so that a distributed storage system with cross-stripe error correction in a large stripe and high reliability can be obtained.

In the same RAID system, different users may use different encoding and decoding methods. For example, users a, c, and e use RAID 6 to perform encoding and decoding, and users b and d use RAID 5 to perform encoding and decoding. In this embodiment, to solve a situation that data cannot be recovered that may occur in FIG. 4, a parity block 1 and a parity block 2 are additionally provided in blank storage areas, so as to perform storage with additional block checking. Taking the RAID system shown in FIG. 2 as an example, two parity blocks, i.e. a parity block 1 and a parity block 2, are provided in the RAID system.

The parity blocks are preferably provided in a RAID 5 stripe, and if there are not RAID 5 stripe, the parity blocks are preferably provided in a stripe with a larger number of blank blocks. By configuring the positions of the parity blocks in this way, the calculation complexity can be reduced. Certainly, the positions of any blank blocks may also be selected as the positions of the parity blocks.

As shown in FIG. 4, the additional parity block 1 exists in the RAID 5 group of the user b, and the parity block 2 exists in the RAID 6 group of the user e. Based on this, an equation 1 can be constructed:

$$
\begin{cases}
e5 \oplus e6 \oplus e7 \oplus e8 \oplus e9 \oplus e10 \oplus e11 \oplus e12 \oplus \text{block } 2 = 0 \\
1^{*}e5 \oplus 2^{*}e6 \oplus 3^{*}e7 \oplus 4^{*}e8 \oplus 5^{*}e9 \oplus 6^{*}e10 \oplus 7^{*}e11 \oplus 8^{*}e12 \oplus 9^{*}\text{block } 2 = 0 \\
\text{block } 1 \oplus b1 \oplus b2 \oplus b3 = 0
\end{cases}
$$

In the equation 1, b3, e8, e11, block 1, and block 2 are unknown check codes, and need to be solved in the encoding phase.

Although the equation 1 can support the traditional RAID 5 and RAID 6, two new unknown variables are obviously introduced: block 1 and block 2, and therefore, relying solely on the original RAID 5 and RAID 6, the equation 1 cannot be solved.

To this end, this embodiment constructs a global position information table. In the example of FIG. 3, the global position information table annotates all the blocks included in the entire system; and in this way, based on this global position information table, the system can handle the worst case: all blocks in the system need to participate in the data recovery process. The example of FIG. 4 is the worst case, where all 48 blocks in the system need to participate in the data recovery process. Certainly, if data storage or recovery is performed on an individual stripe in the system, the element information corresponding to the corresponding stripe can be retrieved from the global position information table.

If all 48 blocks in the system need to be involved in the data recovery process, using Galois Field (GF) arithmetic, particularly GF(8), can expedite computations and mitigate the impact of large-scale data multiplication and division. In GF(8), the polynomial is typically represented as: $P(x)=x^8+x^4+x^3+x^1+1$. The corresponding data mapping table is shown in Table 1.

TABLE 1

| Generating Elements | Polynomial Representation | Binary Representation | Numeric Representation | Derivation Process |
|---|---|---|---|---|
| 0 | 0 | 0000 0000 | 0 | — |
| $x^0$ | $x^0$ | 0000 0001 | 1 | — |
| $x^1$ | $x^1$ | 0000 0010 | 2 | — |
| $x^2$ | $x^2$ | 0000 0100 | 4 | — |
| $x^3$ | $x^3$ | 0000 1000 | 8 | — |
| $x^4$ | $x^4$ | 0001 0000 | 16 | — |

TABLE 1-continued

| Generating Elements | Polynomial Representation | Binary Representation | Numeric Representation | Derivation Process |
|---|---|---|---|---|
| x ^ 5 | x ^ 5 | 0010 0000 | 32 | — |
| x ^ 6 | x ^ 6 | 0100 0000 | 64 | — |
| x ^ 7 | x ^ 7 | 1000 0000 | 128 | — |
| x ^ 8 | x ^ 4 + x ^ 3 + x ^ 2 + 1 | 0001 1101 | 29 | x ^ 7 * x = x ^ 8 mod P(x) |
| x ^ 9 | x ^ 5 + x ^ 4 + x ^ 3 + x | 0011 1010 | 58 | x ^ 8 * x = x ^ 5 + x ^ 4 + x ^ 3 + x |
| x ^ 10 | x ^ 6 + x ^ 5 + x ^ 4 + x ^ 2 | 0111 0100 | 116 | x ^ 9 * x = x ^ 6 + x ^ 5 + x ^ 4 + x ^ 2 |
| . . . | . . . | . . . | . . . | . . . |
| x ^ 255 | 1 | 0000 000 | 1 | — |

According to table 1, and using the described GF8 and Cauchy matrix for encoding, the array composed of various elements in the global position information table is:

$$\begin{bmatrix} \dfrac{1}{a_1 + b_1} & \dfrac{1}{a_1 + b_2} & \cdots & \dfrac{1}{a_1 + b_{47}} & \dfrac{1}{a_1 + b_{48}} \\ \dfrac{1}{a_2 + b_1} & \dfrac{1}{a_2 + b_2} & \cdots & \dfrac{1}{a_2 + b_{47}} & \dfrac{1}{a_2 + b_{48}} \end{bmatrix}$$

Galois field transformation is performed on the array, with a1=1, a2=2; b1=1, b2=2, . . . , and b48=48, so that the global position array corresponding to the global position information table is:

$$v = \begin{bmatrix} 142 & 244 & \ldots & 110 & 72 \\ 244 & 71 & \ldots & 72 & 137 \end{bmatrix}$$

The matrix composed of all data in the example in FIG. 4 is: [a0, a1, a2, a3, a4, a5,0, block 1, . . . , block 2,0,0,0], and a transposed matrix of the matrix is taken to obtain d=[a0, a1, a2, a3, a4, a5,0, block 1, . . . , block 2,0,0,0]T.

Alternatively, an equation 2 can be constructed as follows:

$$v * d = \begin{bmatrix} 142 & 244 & \ldots & 110 & 72 \\ 244 & 71 & \ldots & 72 & 137 \end{bmatrix} *$$

$$[a0, a1, a2, a3, a4, a5, 0, \text{block } 1, \ldots, \text{block } 2, 0, 0, 0]^T = 0$$

At this point, combining the equation 1 and the equation 2, the RAID group in the normal stripe is first used to recover the stripes not involving the erroneous blocks c7 and c8, that is, a3, e8, and e11 are first recovered, and then other data is recovered, so that all blocks: a4, a5, block 1, b3, c1, c8, d1, e2, e8, e11, and block 2 can be obtained.

Hence, in this embodiment, a corresponding number of parity blocks can be set according to different storage reliability requirements, and then encoding and decoding can be performed in the Galois field, so that IOPS can be ensured, and high reliability storage and cross-stripe error correction can be implemented.

The following introduces a data storage apparatus provided in an embodiment of the present application. For the data storage apparatus described below and the data storage method described above, reference may be made to each other.

Referring to FIG. 5, an embodiment of the present application discloses a data storage apparatus, which is applied to a RAID system, the RAID system includes F parity blocks occupying blank storage areas, and includes:

an acquisition component 501, configured to, if at least one parity block is located in any stripe for data to be stored in the RAID system, acquire a global position array that is configured to represent the position of each block in the RAID system;

a forming component 502, configured to, according to the global position array, form a data group by using user data to be stored in the stripe, empty block data, and unknown additional check codes located in the at least one parity block;

a solving component 503, configured to, based on the global position array, the data group and the original encoding method corresponding to the stripe, generate the additional check codes and the check codes corresponding to the original encoding method in a Galois field; and a storage component 504, configured to, according to the global position array, storing the user data, the empty block data, the additional check codes and the check codes corresponding to the original encoding method into corresponding blocks in the stripe.

In an optional embodiment, the generation process of the global position array includes:

generating m mutually-unequal numerical values based on the total number, m, of blocks in the RAID system;

determining F mutually-unequal preset values; and constructing the global position array based on the m mutually-unequal numerical values and the F mutually-unequal preset values.

In an optional embodiment, the global position array is:

$$v = \begin{bmatrix} \dfrac{1}{a_1 + b_1} & \dfrac{1}{a_1 + b_2} & \cdots & \dfrac{1}{a_1 + b_m} \\ \dfrac{1}{a_2 + b_1} & \dfrac{1}{a_2 + b_2} & \cdots & \dfrac{1}{a_2 + b_m} \\ \cdots & \cdots & \cdots & \cdots \\ \dfrac{1}{a_F + b_1} & \dfrac{1}{a_F + b_2} & \cdots & \dfrac{1}{a_F + b_m} \end{bmatrix}$$

wherein, v represents the global position array, $a_1$, $a_2$, . . . , $a_F$ represent F mutually-unequal preset values, and $b_1$, $b_2$, . . . , $b_m$ represent m mutually-unequal numerical values.

In an alternative embodiment, the solving component may be configured to:

based on the global position array and the data group, construct an equation with the additional check codes as an unknown variable;

based on the original encoding method, construct an equation with the additional check codes and the check codes corresponding to the original encoding method as unknown variables; and solve the constructed equations jointly to obtain the additional check codes and the check codes corresponding to the original encoding method.

In an optional embodiment, the value of F is determined based on the block error probability in the RAID system in a preset time period.

In an optional embodiment, the F parity blocks are distributed in any stripe in the RAID system, and/or distributed in a RAID 5 stripe in the RAID system, and/or distributed in a stripe in the RAID system in which the number of blank blocks is greater than a preset threshold.

In an optional embodiment, the method further includes:

a recovery component, configured to if an error occurs in any block in the RAID system, perform data recovery based on the additional check codes and/or a decoding method corresponding to the original encoding method.

For the working process of each component and unit in this embodiment, reference may be made to the corresponding content disclosed in the foregoing embodiments, and no further details are provided herein.

Hence, this embodiment provides a data storage apparatus, which can improve error tolerance and storage efficiency.

The following introduces an electronic device provided in an embodiment of the present application. For the electronic device described below and the data storage method and apparatus described above, reference may be made to each other.

Referring to FIG. 6, an embodiment of the present application discloses an electronic device, including:

a memory 601, configured to store a computer program; and a processor 602, configured to execute the computer program to implement the method according to any of the described embodiments.

The following describes a non-transitory readable storage medium provided in an embodiment of the present application. For the non-transitory readable storage medium described below and the data storage method and apparatus, and the device described above, reference may be made to each other.

A non-transitory readable storage medium is configured to store a computer program, wherein when the computer program, when executed by a processor, implements the data storage method disclosed in the foregoing embodiments. For detailed steps of the method, reference may be made to the corresponding content disclosed in the foregoing embodiments, and no further details are provided herein.

The terms "first", "second", "third", "fourth" and the like (if any) involved in the embodiments of the present application are used to distinguish similar objects, and are not necessarily used to describe a specific sequence or order. It should be understood that the data so used may be interchanged where appropriate so that the embodiments described herein may be practiced in an order other than that illustrated or described herein. In addition, the terms "include" and "have", and any variations thereof, are intended to cover a non-exclusive inclusion, for example, a process, method or device that includes a series of steps or units is not necessarily limited to those steps or units that are expressly listed, but may include other steps or units that are not expressly listed or inherent to such process, method or device.

It should be noted that the description of "first" and "second" in the embodiments of the present application are merely used for description, and cannot be understood as indicating or implying relative importance or implicitly indicating the number of indicated technical features. Thus, the features defined by "first" and "second" may explicitly or implicitly include at least one of the features. In addition, the technical solutions of the embodiments can be combined with each other, but they must be based on the implementation of a person skilled in the art. When the combination of the technical solutions is contradictory or cannot be implemented, it should be considered that the combination of the technical solutions does not exist, and does not belong to the scope of protection of the embodiments of the present application.

The embodiments in this description are described in a progressive manner. Each embodiment focuses on a difference from other embodiments. For the same or similar parts among the embodiments, reference may be made to each other.

The steps of a method or algorithm described in connection with the embodiments disclosed herein may be embodied directly in hardware, in a software module executed by a processor, or in a combination of the two. The software module may be disposed in a random access memory (RAM), a memory, a read-only memory (ROM), an electrically programmable ROM, an electrically erasable programmable ROM, a register, a hard disk, a removable magnetic disk, a CD-ROM, or any other form of non-transitory storage medium known in the art.

The principle and implementation of the embodiments of the present application are illustrated in the present application by using optional examples. The description of the embodiments is merely intended to help understand the method and core ideas of the embodiments of the present application. Meanwhile, a person skilled in the art may make modifications to the optional embodiment and application scope according to the ideas of the embodiments of the present application. In conclusion, the content of the present application shall not be construed as a limitation to the embodiments of the present application.

The invention claimed is:

1. A data storage method, which is applied to a disk array RAID system, the RAID system comprising F parity blocks occupying blank storage areas, and the method comprising:

determining that at least one parity block is located in any stripe for data to be stored in the RAID system;

in response to the at least one parity block being located in the any stripe for data to be stored in the RAID system, acquiring a global position array for representing a position of each block in the RAID system;

according to the global position array, forming a data group by using user data to be stored in the stripe, empty block data, and unknown additional check codes located in the at least one parity block;

based on the global position array, the data group and an original encoding method corresponding to the stripe, generating the additional check codes and check codes corresponding to the original encoding method in a Galois field; and according to the global position array, storing the user data, the empty block data, the additional check codes and the check codes corresponding to the original encoding method into corresponding blocks in the stripe, wherein the original encoding method refer to a RAID level, wherein based on the global position array, the data group and the original encoding method corresponding to the stripe, generating the additional check codes and the check codes corresponding to the original encoding method in the Galois field comprises:

based on the global position array and the data group, constructing an equation with the additional check codes as an unknown variable;

based on the original encoding method, constructing an equation with the additional check codes and the check codes corresponding to the original encoding method as unknown variables; and solving constructed equations jointly to obtain the additional check codes and the check codes corresponding to the original encoding method, wherein, the constructed equations comprise the equation with the additional check codes as the unknown variable and the equation with the additional check codes and the check codes corresponding to the original encoding method as the unknown variables.

2. The method according to claim 1, wherein acquiring the global position array for representing the position of each block in the RAID system comprises:

generating m mutually-unequal numerical values based on a total number, m, of blocks in the RAID system;

determining F mutually-unequal preset values; and constructing the global position array based on the m mutually-unequal numerical values and the F mutually-unequal preset values.

3. The method according to claim 2, wherein the global position array is:

$$v = \begin{bmatrix} \dfrac{1}{a_1+b_1} & \dfrac{1}{a_1+b_2} & \cdots & \dfrac{1}{a_1+b_m} \\ \dfrac{1}{a_2+b_1} & \dfrac{1}{a_2+b_2} & \cdots & \dfrac{1}{a_2+b_m} \\ \cdots & \cdots & \cdots & \cdots \\ \dfrac{1}{a_F+b_1} & \dfrac{1}{a_F+b_2} & \cdots & \dfrac{1}{a_F+b_m} \end{bmatrix}$$

wherein, v represents the global position array, $a_1$, $a_2$, . . . , $a_F$ represent the F mutually-unequal preset values, and $b_1$, $b_2$, . . . , $b_m$ represent the m mutually-unequal numerical values.

4. The method according to claim 2, wherein block positions corresponding to the additional check codes are randomly distributed in the RAID system.

5. The method according to claim 2, wherein block positions corresponding to the additional check codes are distributed in a RAID 5 stripe in the RAID system.

6. The method according to claim 2, wherein block positions corresponding to the additional check codes are distributed in a stripe in the RAID system in which a number of blank blocks is greater than a preset threshold.

7. The method according to claim 1, wherein based on the original encoding method, constructing the equation with the additional check codes and the check codes corresponding to the original encoding method as the unknown variables comprises:

taking the additional check codes and the check codes corresponding to the original encoding method as unknown variables, constructing a system of linear equations as equations of the unknown variables.

8. The method according to claim 7, wherein solving the constructed equations jointly to obtain the additional check codes and the check codes corresponding to the original encoding method comprises:

solving the system of linear equations to obtain the additional check codes and the check codes corresponding to the original encoding method.

9. The method according to claim 1, wherein according to the global position array, storing the user data, the empty block data, the additional check codes and the check codes corresponding to the original encoding method into corresponding blocks in the stripe, comprises:

storage positions of the user data, the empty block data, the additional check codes and the check codes corresponding to the original encoding method in the stripe depend on a load balance policy used by the original encoding method and preset block positions corresponding to the additional check codes.

10. The method according to claim 1, wherein a value of F is determined based on a block error probability in the RAID system in a preset time period.

11. The method according to claim 1, wherein the F parity blocks have at least one distribution mode as follows: the F parity blocks are distributed in any stripe in the RAID system, the F parity blocks are distributed in a RAID 5 stripe in the RAID system, and the F parity blocks are distributed in a stripe in the RAID system in which a number of blank blocks is greater than a preset threshold.

12. The method according to claim 11, wherein the F parity blocks are provided in blank storage areas in the RAID system.

13. The method according to claim 12, wherein in a case that there is no RAID 5 stripe, the parity blocks are first provided in a stripe with a large number of blank blocks.

14. The method according to claim 1, further comprising:

in a case that an error occurs in any block in the RAID system, performing data recovery based on at least one of: the additional check codes, and a decoding method corresponding to the original encoding method.

15. The method according to claim 14, wherein in the case that the error occurs in any block in the RAID system, performing the data recovery based on at least one of the following: the additional check codes, and a decoding method corresponding to the original encoding method, comprises:

in a case that an error occurs in a disk where any block in a stripe is located and data loss occurs in other blocks of the stripe, performing the data recovery based on the additional check codes and the decoding method corresponding to the original encoding method.

16. An electronic device, comprising:

a memory, configured to store a computer program; and a processor, configured to execute the computer program so as to:

in response to at least one parity block being located in any stripe for data to be stored in the RAID system, acquire a global position array for representing a position of each block in the RAID system;

according to the global position array, form a data group by using user data to be stored in a stripe, empty block data, and unknown additional check codes located in the at least one parity block;

based on the global position array, the data group and an original encoding method corresponding to the stripe, generate the additional check codes and check codes corresponding to the original encoding method in a Galois field; and according to the global position array, store the user data, the empty block data, the additional check codes and the check codes corresponding to the original encoding method into corresponding blocks in the stripe, wherein the original encoding method refer to a RAID level, wherein based on the global position array, the data group and the original encoding method corresponding to the stripe, generating the additional check codes and the check codes corresponding to the original encoding method in the Galois field comprises:

based on the global position array and the data group, constructing an equation with the additional check codes as an unknown variable;

based on the original encoding method, constructing an equation with the additional check codes and the check codes corresponding to the original encoding method as unknown variables; and solving constructed equations jointly to obtain the additional check codes and the check codes corresponding to the original encoding method, wherein, the constructed equations comprise the equation with the additional check codes as the unknown variable and the equation with the additional check codes and the check codes corresponding to the original encoding method as the unknown variables.

17. A non-transitory readable storage medium, configured to store a computer program, wherein the computer program, when executed by a processor, cause the processor to:

in response to at least one parity block being located in any stripe for data to be stored in an RAID system, acquire a global position array for representing a position of each block in the RAID system;

according to the global position array, form a data group by using user data to be stored in a stripe, empty block data, and unknown additional check codes located in the at least one parity block;

based on the global position array, the data group and the original encoding method corresponding to the stripe, generate the additional check codes and check codes corresponding to the original encoding method in a Galois field; and according to the global position array, store the user data, the empty block data, the additional check codes and the check codes corresponding to the original encoding method into corresponding blocks in the stripe, wherein the original encoding method refer to a RAID level, wherein based on the global position array, the data group and the original encoding method corresponding to the stripe, generating the additional check codes and the check codes corresponding to the original encoding method in the Galois field comprises:

based on the global position array and the data group, constructing an equation with the additional check codes as an unknown variable;

based on the original encoding method, constructing an equation with the additional check codes and the check codes corresponding to the original encoding method as unknown variables; and solving constructed equations jointly to obtain the additional check codes and the check codes corresponding to the original encoding method, wherein, the constructed equations comprise the equation with the additional check codes as the unknown variable and the equation with the additional check codes and the check codes corresponding to the original encoding method as the unknown variables.

18. The method according to claim 10, wherein a formula for calculating the block error probability P is as follows:

$$
\begin{cases}
lamda' = N * lamda/365/24 \\
delta' = N * delta/365/24 \\
Pe = \sum_{i=R}^{N} \dfrac{(lamba' * i)^i \ e^{(-lamda' * t)}}{i!} * \sum_{j=s}^{N} \dfrac{(delta' * t)^j \ e^{(-delta' * t)}}{j!}, \\
P = \left(I - (1 - Pe)^{(365*24/t)}\right) * \dfrac{E! \, R! \, (N - R)!}{R! N! (E - R)!}
\end{cases}
$$

wherein, N is a total number of disks; R is a average number of parity blocks used in the RAID system; s is a number of simultaneous erroneous blocks which is present; delta is probability of unknown errors occurring in a block during disk operation; E is a total number of the disks in the parity group; lambda is annual failure probability of the disk; and t is a required duration for ensuring secure operation.

19. The method according to claim 18, wherein, s=1+F, or s=2+F.

* * * * *